United States Patent Office 3,423,201
Patented Jan. 21, 1969

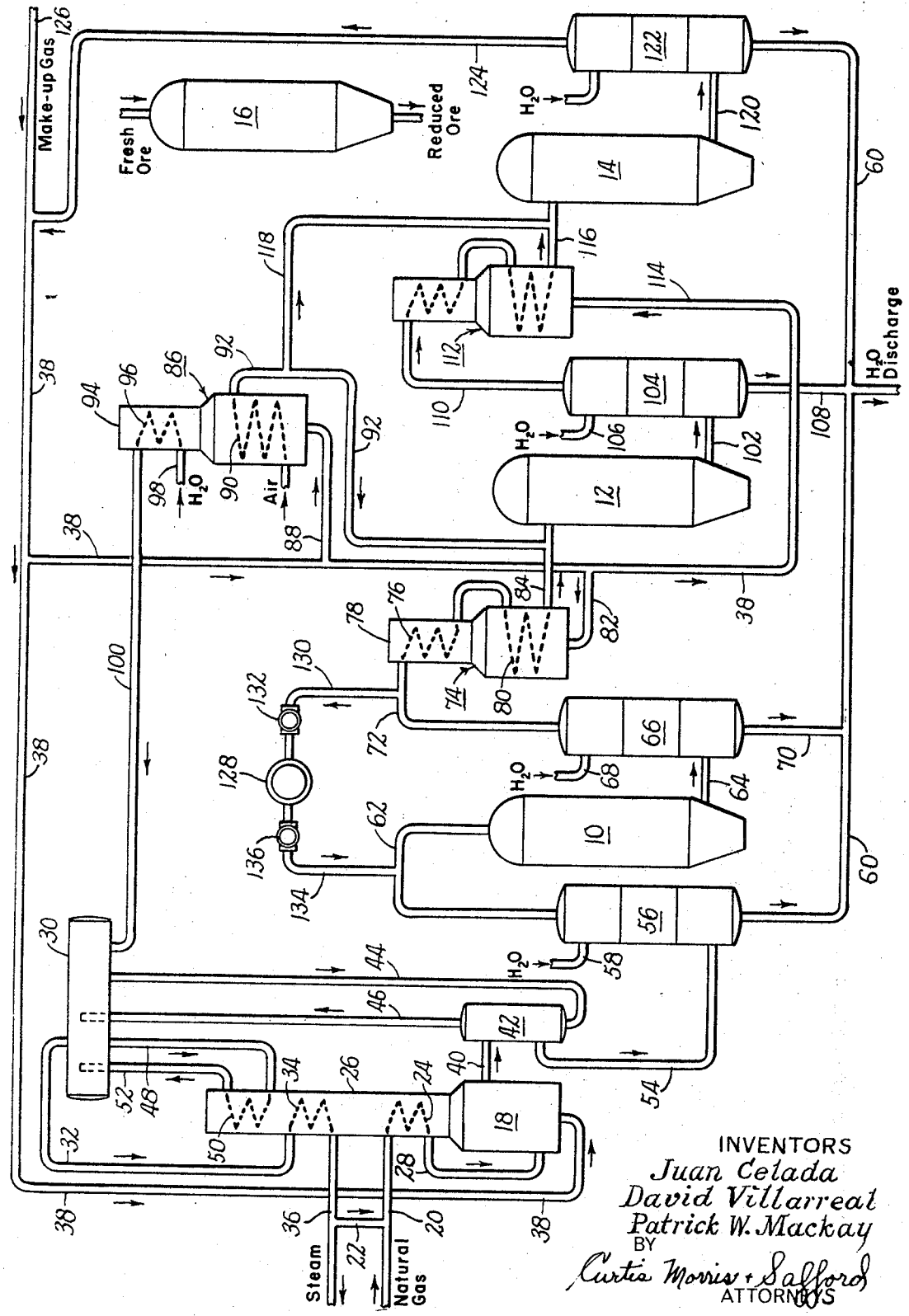

3,423,201
METHOD FOR PRODUCING SPONGE IRON
Juan Celada, Col. del Valle, Nuevo Leon, and David Villarreal and Patrick W. MacKay, Monterrey, Nuevo Leon, Mexico, assignors to Fierro Esponja, S.A., Monterrey, Nuevo Leon, Mexico
Filed Mar. 18, 1966, Ser. No. 535,537
U.S. Cl. 75—35                            7 Claims
Int. Cl. C21b 13/14

This invention relates to the gaseous reduction of metal oxides to elemental metals at elevated temperatures and more particularly, to an improved method of cooling the reduced metal. The invention is especially useful in connection with the direct gaseous reduction of iron oxide ores in lump form to sponge iron and will be illustratively described in connection with this use, although as the description proceeds it will become apparent that the invention can be equally well used in processes wherein metal oxides other than iron oxide are reduced.

In one of its aspects the present invention comprises an improvement in a known semi-continuous process for producing sponge iron, which process is of the general type disclosed for example, in Celada Patent 2,900,247 and in Mader et al. Patents 3,136,623, 3,136,624 and 3,136,625. In such a process a multiple unit reactor system is used in which separate bodies of ferrous material are simultaneously treated. The three principal operations carried out in the reactor system are (1) charging and unloading of the reactors, (2) reduction and (3) cooling of the reduced ore. For convenience these three operations are characterized herein as the production stage, the reduction stage and the cooling stage. In the particular system described herein two reduction stages are used, and hence four reactors are employed to carry out the three principal operations. The reactors are so connected that during a given cycle of operations reducing gas from a suitable source, commonly a mixture largely composed of carbon monoxide and hydrogen, flows successively through the reactor that is at the cooling stage, the reactor that is at the second reducing stage and the reactor that is at the first reducing stage. The fourth reactor is disconnected from the system for unloading and re-loading.

The system is provided with suitable switching valves whereby at the end of each cycle the gas flow can be shifted to cause the cooling stage reactor to become the production stage reactor, the second reducing stage reactor, the second reducing stage reactor to become the cooling stage reactor, the first reducing stage reactor to become the second reducing stage reactor and the production stage reactor to become the first reducing stage reactor. Thus during a set of four cycles each reactor operates successively at all four stages of the operation. In order to simplify the showing in the drawings and the description, the switching connections, which are well known in the art, have been omitted and the operation of the system is described in reference to a particular cycle.

As pointed out in Mader et al. Patent 3,136,624, sponge iron produced by the direct gaseous reduction of iron ore tends to have an undesirably low carbon content. In most cases the sponge iron produced is used to make steel, and if the carbon content of the sponge iron is too low, carbon must be added to the mixture that is melted in the steel-making furnace. In a process of the type described above wherein the carbon-containing reducing gas entering the system is used to cool the reduced metal, it becomes possible, by operating the cooling stage under the proper conditions, to crack a part of the reducing gas to produce carbon that is deposited on the surfaces of the lumps of reduced metal. It has been found that during subsequent melting operations, the carbon deposited on the reduced metal diffuses into the metal and makes possible the melting thereof at temperatures significantly below the melting point of the pure metal. When carbon is separately added to the sponge iron in the steel furnace, such diffusion does not occur to the same extent. Hence deposition of carbon on the sponge iron in the cooling reactor provides an especially efficient way of adding carbon to the sponge iron to be used in the steel-making process.

Although there are evident advantages in using the cooling reactor for both cooling the reduced metal and increasing its carbon content, certain practical difficulties have been encountered when an effort is made to achieve both of these objectives. From the standpoint of securing effective cracking of the reducing gas and carbon deposition on the sponge iron, the temperature at which the gas and reduced metal are contacted should desirably be relatively high, whereas from the standpoint of cooling the reduced metal, on the other hand, the operating temperature of the cooling reactor should be relatively low. The method of the present invention is concerned with the resolution of this dilemma.

It is a general object of the present invention to provide an improved process for the production of sponge iron by direct gaseous reduction of iron ore in a multiple unit reactor system including at least one reducing reactor and at least one cooling reactor.

It is another object of the invention to provide a method of operating the cooling reactor of such a system in such a manner as to achieve both effective deposition of carbon on the reduced metal in the reactor and effective cooling on the reduced metal.

Other objects of the invention will be in part obvious and in part pointed out hereafter.

The objects and advantages of the present invention can be achieved in general by carrying out the cooling operation in the cooling reactor of a reactor system of the type described above in two steps. At the beginning of each operational cycle, the body of ferrous material in the cooling reactor is at a relatively high temperature. In accordance with the present method a first cooling step is used wherein the incoming reducing gas is fed to the cooling reactor at essentially the same rate as required to supply the second stage reducing reactor, and all of the gas leaving the cooling reactor is transferred to, and passed through the body of ferrous material in, the second stage reducing reactor. During the second cooling step of each cycle a portion of the gas leaving the cooling reactor is removed from the stream flowing to the reducing reactors and recycled to the cooling reactor gas inlet. Thus during the first cooling step a relatively low gas flow rate is employed to maintain the body of ferrous material at a temperature sufficient to crack the reducing gas and deposit carbon over a relatively long period. When the temperature of the ferrous material in the cooling reactor has dropped below the value at which cracking of the reducing gas occurs, the second cooling step is initiated wherein a portion of the reducing gas leaving the cooling reactor is cooled and recycled to increase the flow rate through the reactor and accelerate cooling of the ferrous material therein to a temperature close to room temperature.

The optimum volume of gas to be recycled in the second cooling step will vary with such factors as the reduction temperature used, the amount of material being treated in the reactor, the temperature of the recycle gas and the length of time required to complete the reduction operation in the reducing reactors. If, for example, a 6-hour reducing cycle is used, the gas recycle rate to the cooling reactor may be lower than when a 4-hour reducing cycle is used, since in the former case more time is available for decreasing the temperature of the ferrous material in the reducing reactor to the desired relatively low temperature. It has been found that, in general, the amount of gas recycle in the second cooling step should be such as to increase the gas flow through the cooling reactor to from about 1.5 to 5 times the flow during the first cooling step. Thus the preferred ratio of recycled gas to inlet gas is from about 0.5:1 to 4:1.

The objectives and advantages of the present invention may best be understood and appreciated by reference to the accompanying drawing which illustrates schematically a reactor system capable of being used to carry out the method of the invention. Referring to the drawing, the reactor system there shown comprises four reactors, namely, the cooling reactor 10, the second stage reducing reactor 12, the first stage reducing reactor 14 and the production reactor 16. In the system shown in the drawing the reducing gas used is largely composed of carbon monoxide and hydrogen and is formed by a catalytic reaction between steam and natural gas in a reformer furnace 18 shown at the left of the drawing. Natural gas from a suitable source (not shown) enters the system through conduit 20 and is mixed with steam supplied through conduit 22 from a source presently to be described. The mixture of natural gas and steam flows through a heat exchange coil 24 located in the stack 26 of furnace 18 and thence through conduit 28 to a body of catalyst within furnace 18.

Steam for admixture with the natural gas is supplied from a steam drum 30 which normally contains water as well as water vapor. Steam from drum 30 flows through conduit 32, a heat exchange coil 34 in stack 26 and conduit 36 which is connected to branch conduit 22. Since the system produces more steam than is required for reaction with the natural gas, excess steam is withdrawn from the system through conduit 36.

Within furnace 18 the natural gas and steam are converted at an elevated temperature to a hydrogen-carbon monoxide reducing gas mixture by a known process. The furnace is heated by gas supplied from a fuel gas header 38. The reducing gas leaves the furnace through conduit 40 and flows to a waste heat boiler 42 wherein a part of the sensible heat of the gas is used to vaporize hot water flowing to the boiler from steam drum 30 through conduit 44. The resulting steam is returned to the steam drum through conduit 46. Further heat is supplied to the steam drum by causing hot water to be withdrawn therefrom through conduit 48, pass through a coil 50 in stack 26 and return to the steam drum through conduit 52.

The partially cooled reducing gas leaves boiler 42 through conduit 54 and flows to a quench tower 56 wherein it is further cooled by flowing counter-current to a spray of water supplied through conduit 58. Hot water is removed at the bottom of tower 56 and leaves the system through a hot water discharge header 60.

The cooled reducing gas from the top of tower 56 constitutes the gas supply to the cooling and reducing reactors. Its flow will be initially described as of the beginning of an operating cycle when the first cooling step described above is being carried out in the cooling reactor. At this time the reactor 10 contains a body of ferrous material that is essentially sponge iron but contains a small amount of iron oxide. The sponge iron in reactor 10, having previously undergone two reduction stages is at about the same temperature as the ferrous material of the reduction stages, i.e., about 1800° to 2000° F.

At the beginning of the cycle reducing gas flows from the top of tower 56 through conduit 62 to the top of reactor 10, and thence down through the bed of sponge iron therein. Due to the high temperature in the reactor a portion of the reducing gas is cracked therein and carbon is deposited on the surfaces of the sponge iron lumps. Also a further portion of the small amount of iron oxide remaining in the sponge iron is reduced.

From the bottom of reactor 10 the reducing gas flows through a conduit 64 to a quench tower 66 similar to tower 56. Cooling water is supplied to the top of tower 66 by a conduit 68 and hot water flows from the bottom of tower 66 through conduit 70 to the water discharge header 60. The quench tower 66 operates to cool the reducing gas and condense water therefrom, and thus removes water vapor, which is a non-reducing constituent, from the reducing gas.

In the system shown in the drawing the reducing gas is mixed with a small amount of air before being introduced into the reduction reactors. This feature is disclosed in Celada Patent 2,900,247 wherein the reasons for air addition, the amounts of air to be added and the temperatures that are desirably used are fully discussed. In general, the reducing and air streams are separately preheated and mixed to cause a small amount of the reducing gas to be burned and thereby produce a relatively high temperature reducing gas mixture.

Referring again to the drawing, reducing gas from the top of tower 66 flows through conduit 72 to the preheater 74. More particularly, the gas flows first through an auxiliary heat exchange coil 76 in the stack 78 of preheater 74 and then through the main coil 80 thereof. The preheater is heated by fuel gas supplied from header 38 through branch conduit 82. The preheated reducing gas flows to reactor 12 through conduit 84.

Air to be mixed with the reducing gas is preheated in preheater 86, the heat being provided by combustion of fuel gas supplied from header 38 through conduit 88. Air flows through the main heat exchange coil 90 of heater 86 and then through conduit 92 to the gas stream in conduit 84. Preheater 86 is provided with a stack 94 containing an auxiliary heat exchange coil 96 used to preheat water for the steam drum 30. Water supplied through conduit 98 is heated in coil 96 and then flows through conduit 100 to steam drum 30.

The preheaters 74 and 86 typically preheat the reducing gas and air respectively to temperatures of the order of 1500° to 1800° F. and the burning of a portion of the reducing gas by the air produces a reducing mixture at about 1800° to 2100° F. This mixture is supplied to second reducing stage reactor 12 and flows downwardly through the body of ferrous material therein. It should be noted that the relation between gas flow and ore in the reducing reactors is generally counterflow, that is to say, the fresh reducing gas is used to reduce partially reduced ore, and partially spent reducing gas is used to reduce the ore that has not previously been reduced.

After passing through the body of ferrous material in reactor 12, the reducing gas flows through conduit 102 to quench tower 104 which, like towers 56 and 66 quenches and cools the gas to remove water therefrom. Tower 104 is supplied with cooling water through conduit 106 and discharges water through conduit 108 to header 60. From the top of tower 104 the reducing gas flows through conduit 110 to a preheater 112, similar to preheater 74 and is heated by fuel gas supplied from header 38 through branch pipe 114.

The gas is preheated in heater 112 and flows through conduit 116 to the first reducing stage reactor 14. As in the case of reactor 12, the gas fed to reactor 14 is mixed with a minor amount of air before being introduced into the reactor. Preheated air for this purpose is supplied from preheater 86 through conduits 92 and 118. The gas entering reactor 14 flows downwardly through the body of unreduced ore and effects a partial reduction thereof. It then flows through conduit 120 to quench tower 122 which is similar to towers 56, 66 and 104. Since the gas at this point is relatively low in reducing constituents, it is not used further as a reducing medium but is transferred through conduit 124 to the fuel gas header 38. As indicated at the upper right-hand corner of the drawing, make-up natural gas may be introduced into fuel gas header 38 from conduit 126 as required.

At the beginning of the cycle being described, production reactor 16 is disconnected from the system, and remains disconnected during the entire cycle of cooling and reducing operations in reactors 10, 12 and 14. During this period the cooled and reduced sponge iron in reactor 16 is removed therefrom, and the reactor is loaded with fresh ore. At the beginning of the following cycle it is connected back into the system by means not shown in the schematic drawing and becomes the first stage reduction reactor in the following cycle of operations.

As indicated above, the foregoing description indicates the gas flow as of the beginning of a cycle of operations, at which time cooling reactor 10 contains a sponge iron load at close to the reducing temperature. At this time all of the reducing gas flowing through reactor 10 is transferred to the second stage reducing reactor 12. As the temperature of the sponge iron bed in reactor 10 drops due to flow of cool gas therethrough, a point is reached at which cracking of the gas and deposition of carbon on the sponge iron ceases. At about this point the cooling of the sponge iron is desirably accelerated. In accordance with the present method the second cooling step referred to above is initiated wherein a portion of the gas is recycled by means now to be described.

Functionally interposed between conduits 62 and 72 there is a recycled compressor 128, the inlet of which is connected by conduit 130 containing valve 132 with conduit 72 and the discharge of which is connected by conduit 134 containing valve 136 with conduit 62. The arrangement is such that during the second cooling step valves 132 and 136 can be opened to divert a selected portion of the cooled gas flowing through conduit 72 and recycle it through the reactor 10 to increase the mass flow of gas therethrough. In this way effective cooling of the sponge iron to a temperature near room temperature can be achieved, even though the gas flow rate through the reducing reactors is insufficient to produce adequate cooling.

It is of course to be understood that the foregoing description is illustrative only and that numerous changes can be made in the reaction system illustratively described herein. Thus although two reducing stages have been described, it will be evident that under certain circumstances a single stage or more than two stages may be used. Also the number of reactors used in any stage can be varied. Other modifications within the scope of the invention will be apparent to those skilled in the art.

We claim:

1. In a method of reducing iron ore to produce sponge iron in a multiple unit reactor system of the type in which separate bodies of ferrous material are simultaneously treated in the several reactors of said system, and in which at least one of said reactors is maintained at a reduction stage in which the ore is contacted with hot carbon containing reducing gas and at least one of said reactors is maintained at a cooling stage in which the reduced ore is cooled, said method being of the type in which carbon containing reducing gas from a source of gas flows through the body of ferrous material in a reactor at said cooling stage and thereafter through a body of ferrous material in a reactor at said reducing stage, the improvement which comprises cooling the body of ferrous material at said cooling stage in two sequential steps, in the first of which steps said reducing gas is passed through the body of ferrous material in said cooling stage reactor at essentially the same rate as said gas is fed to the body of ferrous material in said reducing stage reactor and in the second of which steps a portion of the reducing gas leaving the body of ferrous material in said cooling stage reactor is cooled and recirculated to the cooling stage reactor to accelerate the cooling of the body of ferrous material at said cooling stage during the latter part of the cooling cycle.

2. A method according to claim 1 and wherein the recirculated gas is compressed before being reintroduced into said cooling stage reactor.

3. A method according to claim 1 and wherein the flow ratio of recirculated gas to inlet gas to said cooling stage reactor is between about 0.5:1 and 4:1.

4. In a method of reducing a metal oxide to metal in a multiple unit reactor system of the type in which separate bodies of metal-bearing material are simultaneously treated in the several reactors of said system, and in which at least one of said reactors is maintained at a reduction stage in which the metal oxide is contacted with hot carbon containing reducing gas and at least one of said reactors is maintained at a cooling stage in which the reduced oxide is cooled, said method being of the type in which carbon containing reducing gas from a source of gas flows through the body of metal-bearing material in a reactor at said cooling stage and thereafter through a body of metal-bearing material in a reactor at said reducing stage, the improvement which comprises cooling the body of metal-bearing material at said cooling stage in two sequential steps, in the first of which steps said reducing gas is passed through the body of metal-bearing material in said cooling stage reactor at essentially the same rate as said gas is fed to the body of metal-bearing material in said reducing stage reactor and in the second of which steps a portion of the reducing gas leaving the body of metal-bearing material in said cooling stage reactor is cooled and recirculated to the cooling stage reactor to accelerate the cooling of the body of metal-bearing material at said cooling stage during the latter part of the cooling cycle.

5. In a method of reducing iron ore to produce sponge iron in a multiple unit reactor system of the type in which separate bodies of ferrous material are simultaneously treated in the several reactors of said system, and in which at least one of said reactors is maintained at a reduction stage in which the ore is contacted with hot carbon containing reducing gas and at least one of said reactors is maintained at a cooling stage in which the hot reduced ore is cooled, said method being of the type in which carbon containing reducing gas from a source of gas flows through the body of ferrous material in a reactor at said cooling stage and thereafter through a body of ferrous material in a reactor at said reducing stage, the improvement which comprises during a first time period passing cool reducing gas from said source through a reactor at said cooling stage to cause said reducing gas to absorb heat from the hot reduced ore therein and thence at essentially the same mass rate through said body of ferrous material in said reducing stage reactor, and during a second time period withdrawing a portion of the gas between said cooling and reduction stage reactors, cooling and recirculating said portion of the gas through the cooling stage reactor unit to accelerate cooling of the reduced ore in the cooling stage reactor unit.

6. A method according to claim 5 and wherein the reducing gas flowing from said cooling stage reactor unit to said reducing stage reactor unit is quenched to remove water therefrom and then reheated before being introduced into the reduction stage reactor unit.

7. A method according to claim 6 and wherein the recirculated reducing gas is withdrawn after said gas is quenched and before it is reheated.

References Cited
UNITED STATES PATENTS

| | | | |
|---|---|---|---|
| 2,774,662 | 12/1956 | Graham et al. | 75—26 |
| 2,900,247 | 8/1959 | Celada | 75—34 |
| 3,128,174 | 4/1964 | Celada | 75—34 |
| 3,135,598 | 6/1964 | Mizushima | 75—34 X |
| 3,136,623 | 6/1964 | Mader et al. | 75—34 |
| 3,136,624 | 6/1964 | Mader et al. | 75—34 |
| 3,136,625 | 6/1964 | Mader et al. | 75—34 |
| 3,369,888 | 2/1968 | Cruse | 75—34 |
| 3,375,098 | 3/1968 | Marshall | 75—35 |

L. DEWAYNE RUTLEDGE, *Primary Examiner.*

H. W. TARRING, *Assistant Examiner.*

U.S. Cl. X.R.

75—26